United States Patent [19]

Peterson

[11] Patent Number: 5,031,981
[45] Date of Patent: Jul. 16, 1991

[54] ATTACHMENT AND DISENGAGEMENT TOOL FOR BAYONET TYPE OPTICAL FIBER CONNECTOR

[75] Inventor: Matthew A. Peterson, Elizabethtown, Pa.

[73] Assignee: AMP Incorporated, Harrisburg, Pa.

[21] Appl. No.: 613,194

[22] Filed: Nov. 15, 1990

[51] Int. Cl.$^5$ .............................................. G02B 6/36
[52] U.S. Cl. ................................ 350/96.2; 81/176.15; 81/176.2
[58] Field of Search ................ 350/96.2, 96.21; 7/107, 7/138; 81/52, 176.15, 176.2, 124.2

[56] References Cited

U.S. PATENT DOCUMENTS

| | | | |
|---|---|---|---|
| 1,318,088 | 10/1919 | Klein . | |
| 2,489,645 | 11/1949 | Jensen et al. | 171/119 |
| 3,354,756 | 11/1967 | Rusk | 81/90 |
| 3,995,363 | 12/1976 | Medina, Jr. | 29/280 |
| 4,416,059 | 11/1983 | Humphrey et al. | 29/751 |
| 4,759,122 | 7/1988 | Weintraub | 29/750 |
| 4,846,564 | 7/1989 | Caron et al. | 350/96.2 |
| 4,848,195 | 7/1989 | Hokenbery | 81/176.15 |

Primary Examiner—John D. Lee
Assistant Examiner—Stephen W. Barns

[57] ABSTRACT

An attachment and disengagement tool (30) is provided for a bayonet connector (1) for an optical fiber cable (2). The bayonet connector (1) comprises a coupling nut (14) moveable axially over the body of the connector (1). The nut (14) has a pattern of raised knurls (21) and further has J-shaped bayonet slots (22) for accepting of the bayonet pin (23) of a coupling bushing (24) complementary to the connector (1). The attachment and disengagement tool (30) comprises a trough-shaped main body (31) with cup-shaped center bore (32) extending therethrough, and a cradle-shaped forward extension (36) with cup-shaped bore (37) coextending with the bore (32) of the main body (31) and partially inset into the front of the main body (31) to form a partial annular shoulder (38) at the intersection of the extension (36) with the main body (31). The extension (36) has forward-extending L-shaped engaging tangs (39) with rear stems (40) forming latching recesses (41) circumferential to the common bore (32, 37). The latching recesses (41) are shaped to accept the pattern of raised knurls (21) of the coupling nut (14). The tool (30) is used in a method of disengaging a connector (1) from packed bushings (24) and in a method of attaching a connector (1) to such bushings (24).

6 Claims, 3 Drawing Sheets

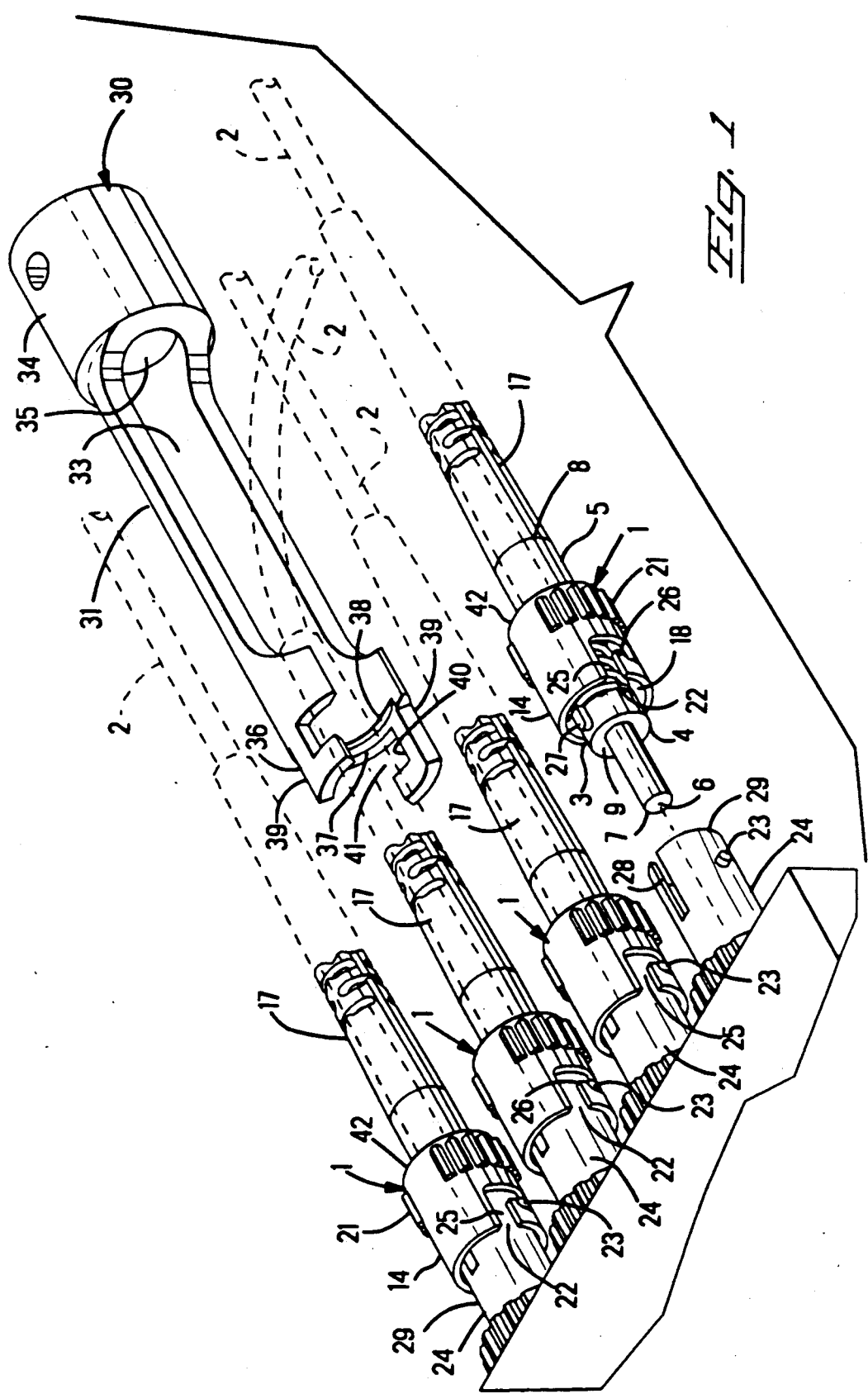

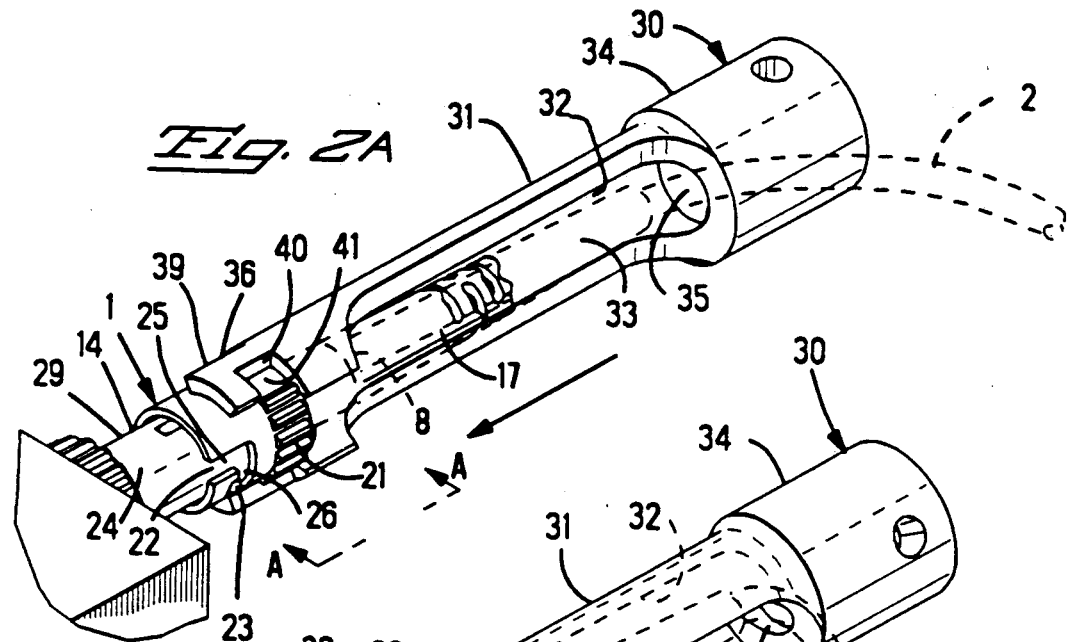
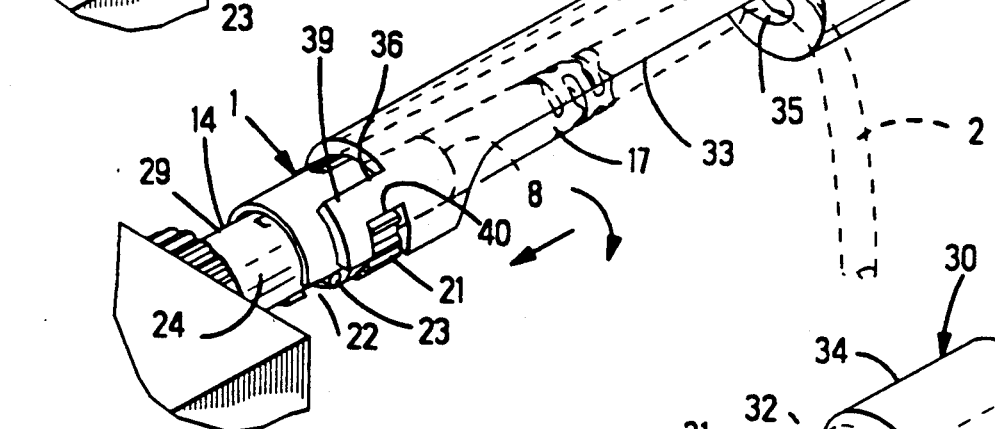
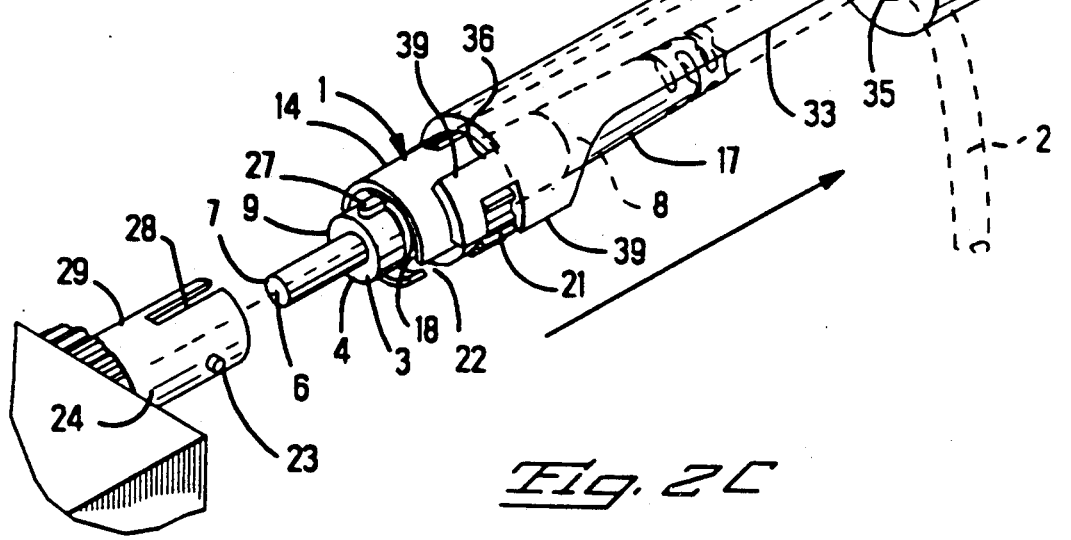

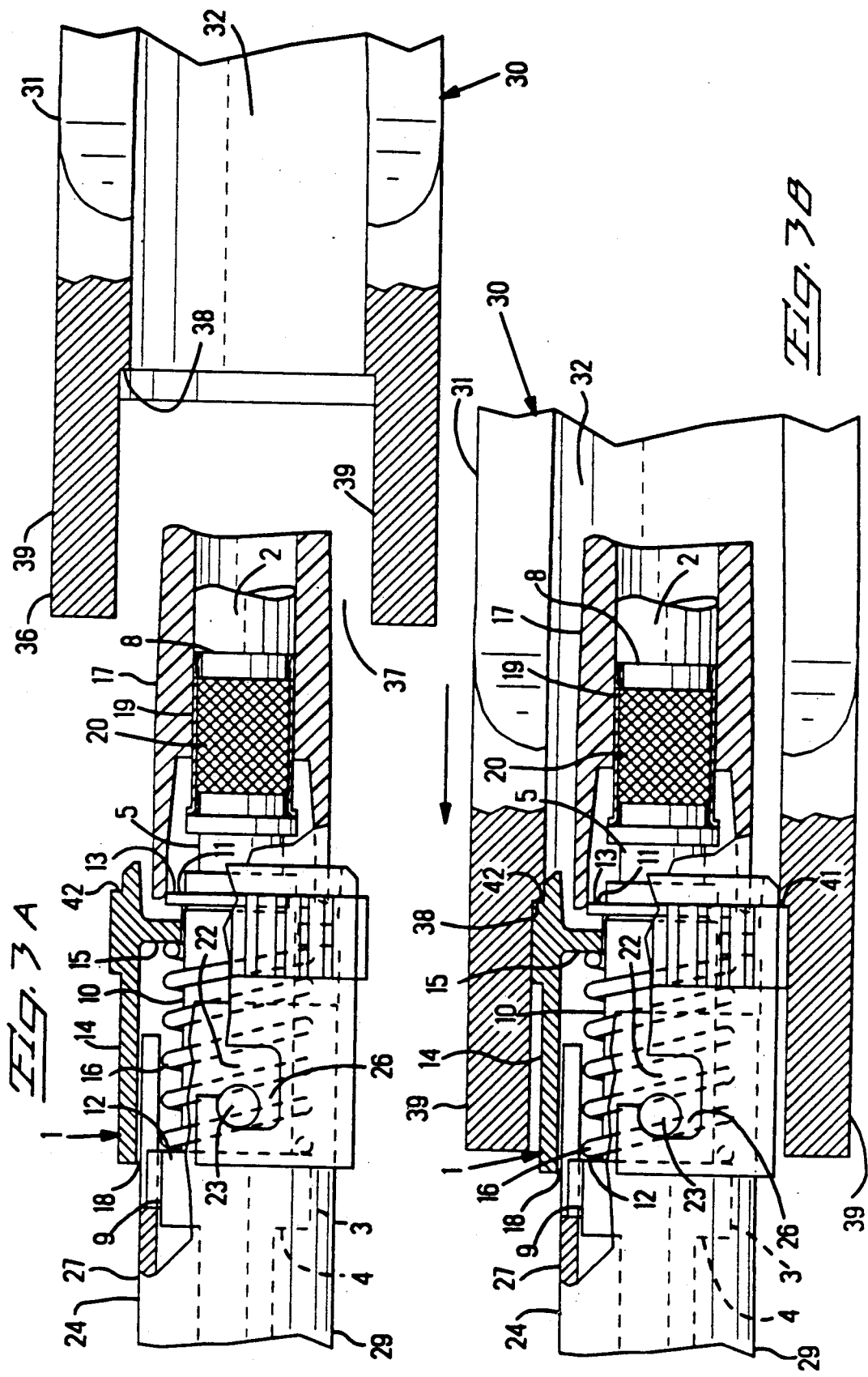

ATTACHMENT AND DISENGAGEMENT TOOL FOR BAYONET TYPE OPTICAL FIBER CONNECTOR

FIELD OF THE INVENTION

The present invention relates to a tool for attaching and disengaging bayonet type optical connectors at areas of tightly packed coupling bushings.

BACKGROUND OF THE INVENTION

The present invention relates to a tool, useable in conjunction with bayonet type optical fiber connectors. In some applications, bushings for the connection of optical fiber connectors, such as bayonet type connectors, are packed within a relatively confined area. In such cases, attaching the connectors to or removing them from respective bushings may be difficult because of the confined area in which attachment or disengagement is being made. The present invention relates to for attaching and disengaging bayonet type optical connectors from areas of tightly packed coupling bushings.

SUMMARY OF THE INVENTION

The tool of the present invention is useable in conjunction with bayonet-type optical connectors such as those disclosed by (14359) comprising an alignment ferrule having a central passage for aligning an optical fiber. The connector further comprises a coupling nut moveable axially over the body of the connector and having a pattern of raised knurls and further having J-shaped bayonet slots for accepting of the bayonet pin of a coupling bushing complementary to the connector.

The ferrule of the connector may be described further as having a radially enlarged collar and a circumferential groove spaced from a rear transverse face of the collar. The connector further comprises a snap ring mounted in the groove, a coupling nut moveable axially over the ferrule and having a transverse inner flange encircling the alignment ferrule forward of the snap ring, and a spring for compression directly in engagement against the rear transverse face of the collar and for compression against the inner flange. There is a clearance between the coupling nut and the collar in which the collar is moveable during retraction of the collar into the coupling nut to compress the spring.

The attachment and disengagement tool comprises a trough-shaped main body with cup-shaped center bore extending therethrough. The tool has a cradle-shaped forward extension with a cup-shaped bore coextending with the bore of the main body. The extension is inset into the front of the main body to form a partial annular shoulder at the intersection of the extension with the main body. The extension has forward-extending L-shaped engaging tangs with rear stems forming latching recesses circumferential to the common bore of the tool. The latching recesses are shaped to fit around and to abut against the pattern of raised knurls of the coupling nut of the bayonet connector. The cup-shaped bore of the extension approximates the outer diameter of the coupling nut of the bayonet connector for sliding fit with the connector nut to permit the rearward surface of the coupling nut to abut the partial annular shoulder.

The invention also relates to a method of disengaging a bayonet connector utilizing the tool wherein the method comprises first encompassing the nut of the bayonet connector within the cradle-shaped forward extension of the tool, abutting the rear end of the nut against the partial annular shoulder of the tool, rotating the tool to engage the pattern of raised knurls of the bayonet connector within the latching recesses, advancing the tool and encompassed nut against the bias of the spring load to disengage each bushing pin from the hook of each J-slot, rotating the tool and encompassed nut to align the stem of each J-slot to each pin, withdrawing the tool and encompassed nut to thereby pass the stem of the J-slot along the pin to exit the pin from engagement in the slot thereby disengaging the bayonet connecter and cable from the complementary coupling bushing.

The invention also includes a method for attaching a bayonet connector using the tool wherein the method comprises encompassing the nut of the bayonet connector within the cradle-shaped forward extension of the tool, abutting the rear end of the nut against the partial annular shoulder of the tool, rotating the tool to engage the pattern of raised knurls of the bayonet connector within the latching recesses of the tool, fitting the ferrule of the bayonet connector to within the body of the coupling bushing, and with pins of the bushing aligned with respective stems of the J-shaped slots of the connector, advancing the tool and encompassed nut against the bias of the spring load to thereby pass each stem of the J-slot along the pin to advance each pin to the end of each stem of the slots, rotating the tool and encompassed nut to align each of the pins with a respective hook of each slot, and withdrawing the tool and encompassed nut with the bias of the spring load to engage each bushing pin within the hook of each J-slot.

BRIEF DESCRIPTION OF THE DRAWINGS

FIG. 1 is a perspective view of a bank of packed bushings and bayonet connectors and the tool of the present invention.

Each of FIGS. 2A, 2B and 2C is a perspective view of a bushing, bayonet connector and engaged tool illustrating a successive step in disengaging the connector from the bushing.

FIG. 3A is a cut away side view of engaged bushing and connector also showing a cut away view of the tool, and FIG. 3B is a cut away side view of bushing, connector and engaged tool along the line A—A of FIG. 2A.

DESCRIPTION OF A PREFERRED EMBODIMENT

Referring to the Figures, is shown, by way of example, a bayonet type connector 1 for an optical fiber cable 2. The connector 1 includes a rigid alignment ferrule 3 in the form of a ceramic portion 4 and a metal portion 5. The connector 1 has an axial central passage 6 through front end 7 for aligning the optical fiber of the cable 2. The passage 6 continues through the body of the ferrule 3 and emerges from a rear end 8 for connection to the optical fiber cable 2. The alignment ferrule 3 includes, a radially enlarged collar 9 surrounding the ferrule 3, a cylindrical surface 10 of the ferrule 3 intersecting the collar 9, and a circumferential groove 11 spaced from a transverse rear face 11 of the collar 9. The connector 1 further includes, a snap ring 13 mounted in the groove 11, a coupling nut 14 moveable axially over the alignment ferrule 3 and having a transverse radially projecting, inner flange 15 encircling the alignment ferrule 3 forward of the snap ring 13, a coil spring 16 for compression directly in engagement against the rear face 17 of the collar 9 and for urging a force of compression against the inner flange 15, and a clearance 18 between the coupling nut 14 and the collar 9. Also shown is crimp ferrule 19 which is compressed to the alignment ferrule 3 at knurling 20, and strain relief 17.

The coupling nut 14 has a pattern of raised knurls 21 and further is characterized by J-shaped slots 22 for connection with the pins 23 of coupling bushing 24. Each slot 22 has stem portion 25 and hook portion 26. Further shown is aligning key 27 on enlarged collar 9 for fit to slot 28 of coupling bushing 24. The front end 7 of the alignment ferrule 3 is rigid and is constructed to enter an alignment sleeve, not shown, within the sleeve 29 of the coupling bushing 24. The nut 14 of the connector 1 encompasses the sleeve 29. The pins 23 of the bushing 24, are perpendicular to the circumference of the sleeve 29 of the bushing 24 and the pins 23 are received within the J-shaped slots 22 of the nut 14 with the nut 14 biased by spring load to maintain said pin 23 at the end of the hook 26 of each slot 28. In response to abutment of the front end 7 with the alignment ferrule of the coupling bushing 24, the collar 9 is moveable with the coupling nut 14 to compress the spring 16 and produce the spring bias to urge the front end 7 into desired abutment as above described. The collar 9 is moveable in and along the clearance 18 during retraction of the collar 9 into the coupling nut 14 to compress the spring 16.

Further illustrated in the Figures, is the attachment and disengagement tool 30 of the present invention. The tool 30 comprises a trough-shaped main body 31 with cup-shaped center bore 32 formed with open throat 33. The rearward portion 34 of the tool 30 has a bore 35 which is shaped to accept an extension tool 30. The tool 30 has a cradle-shaped forward extension 36 with cup-shaped bore 37 coextending with the bore 35 of the main body 31 and partially inset into the front of said main body 31 to form a partial annular shoulder 38 at the intersection of the extension 36 with the main body 31. The extension 36 has forward-extending L-shaped engaging tangs 39 with rear stems 40 forming latching recesses 41 circumferential to the common bore 35, 37. The latching recesses 41 are shaped to fit around and to abut against the pattern of raised knurls 21 of the coupling nut 14 of the bayonet connector 1.

Particularly with reference to FIGS. 2A, 2B and 2C, and FIGS. 3A and 3B, the method of disengaging a bayonet connector 1 from a coupling bushing 24 utilizing the tool 30 of the present invention comprises encompassing the nut 14 of the bayonet connector 1 within the cradle-shaped forward extension 36 of the tool 30 with the extending optical fiber cable 2 passing first through strain relief 17, also encompassed by the forward extension of the tool 30, and then out through throat 33. The tool 30 is advanced until the rear end 42 of the coupling nut 14 abuts against the partial annular shoulder 38. The tool 30 is rotated to engage the pattern of raised knurls 21 of the bayonet connector 1 within the latching recesses 41. The tool 30 and encompassed nut 14 are advanced against the bias of the spring load of spring 16 to disengage each bushing pin 23 from the hook 26 of each J-slot 22. The tool 30 and encompassed nut 14 are then rotated to align the stem 25 of each J-slot 22 to each pin 23. The tool 30 is withdrawn thereby withdrawing the encompassed nut 14 whereby the stem 40 of the J-slot 22 is passed along the pin 23 to exit the pin 23 from engagement in the slot 22 thereby disengaging the bayonet connecter 1 and cable 2 from the complementary coupling bushing 24.

To attach a connector 1 to a coupling bushing 24, the nut 14 of the connector 1 is encompassed within the cradle-shaped forward extension 36 of the tool 30 with the extending optical fiber cable 2 passing first through strain relief 17, also encompassed by the forward extension of the tool 30, and then out through throat 33. The tool 30 is advanced until the rear end 42 of the nut 14 abuts against the partial annular shoulder 38. The tool 30 is rotated to engage the pattern of raised knurls 21 of the bayonet connector 1 within the latching recesses 41. The ferrule 3 of the bayonet connector 1 is fitted to within the body 29 of the coupling bushing 24 with pins 23 of the bushing 24 aligned with respective stems 25 of the J-shaped slots 22 of the connector 1. The tool 30 and encompassed nut 14 are advanced against the bias of the spring load of coil spring 16 to thereby pass each stem 25 of each J-slot 22 along the pin 23 to advance each pin 23 to the end of each stem 25 of each slot 22. The tool 30 and encompassed nut 14 are rotated to align each pin 23 with a respective hook 26 of each slot 22. The tool 30 and encompassed nut 14 are then withdrawn with the bias of the spring load to engage each bushing pin 23 within the hook 26 of each J-slot 22.

While what has been described constitutes a presently preferred embodiment of the invention, it should be recognized that tool of the present invention may take other forms so long as it is characterized by a trough-shaped main body with cup-shaped center bore, and a cradle-shaped forward extension with forward-extending L-shaped engaging tangs shaped to fit around and to abut against the pattern of raised knurls of a bayonet connector. Accordingly, it should be understood that the invention is to be limited only insofar as required by the scope of the following claims.

I claim:

1. An attachment and disengagement tool for a bayonet connector, the bayonet connector comprising a coupling nut moveable axially over the body of the connector and having a pattern of raised knurls and further having J-shaped bayonet slots for accepting of the bayonet pin of a coupling bushing complementary to said connector, wherein said tool comprises;

a trough-shaped main body with cup-shaped center bore extending therethrough, cradle-shaped forward extension with cup-shaped bore coextending with the bore of said main body and partially inset into the front of said main body to form a partial annular shoulder at the intersection of the extension with said main body;

said extension having forward-extending L-shaped engaging tangs with rear stems forming latching recesses circumferential to the said common bore, the latching recesses shaped to fit around and to abut against the pattern of raised knurls of the coupling nut of said bayonet connector.

2. The attachment and disengagement tool of claim 1, wherein the said bayonet connector comprises; an alignment ferrule having a central passage for aligning an optical fiber and having a radially enlarged collar and a circumferential groove spaced from a rear transverse face of the collar, and with rear circumferential groove and flange; the connector further comprising; a snap ring mounted in the groove, a coupling nut moveable axially over the ferrule and having a transverse inner flange encircling the alignment ferrule forwardly of the snap ring, a spring for compression directly in engagement against the rear transverse face of the collar and for compression against the inner flange, a clearance between the coupling nut and the collar in which the collar is moveable during retraction of the collar into the coupling nut to compress the spring and having a radially enlarged collar and a circumferential groove spaced from a rear transverse face of the collar, and with rear circumferential groove and flange; the connector further comprising; a snap ring mounted in the groove, a coupling nut moveable axially over the ferrule and having a transverse inner flange encircling the alignment ferrule forwardly of the snap ring, and a spring for compression directly in engagement against the rear transverse face of the collar and for compression against the inner flange with a clearance between the coupling nut and the collar in which the collar is moveable during retraction of the collar into the coupling nut to compress the spring.

3. The attachment and disengagement tool of claim 1 or claim 2 wherein the cup-shaped bore of said extension approximates the outer diameter of the coupling nut of said bayonet connector for sliding fit with the said nut to permit the rearward surface of the coupling nut to abut the said partial annular shoulder.

4. The attachment and disengagement tool of claim 3, wherein the bayonet connector comprises; an alignment ferrule having a central passage for aligning an optical fiber and having a radially enlarged collar and a circumferential groove spaced from a rear transverse face of the collar, and with rear circumferential groove and flange; the connector further comprising; a snap ring mounted in the groove, a coupling nut moveable axially over the ferrule and having a transverse inner flange encircling the alignment ferrule forwardly of the snap ring, a spring for compression directly in engagement against the rear transverse face of the collar and for compression against the inner flange, a clearance between the coupling nut and the collar in which the collar is moveable during retraction of the collar into the coupling nut to compress the spring; and having a radially enlarged collar and a circumferential groove spaced from a rear transverse face of the collar, and with rear circumferential groove and flange; the connector further comprising; a snap ring mounted in the groove, a coupling nut moveable axially over the ferrule and having a transverse inner flange encircling the alignment ferrule forwardly of the snap ring, and a spring for compression directly in engagement against the rear transverse face of the collar and for compression against the inner flange with a clearance between the coupling nut and the collar in which the collar is moveable during retraction of the collar into the coupling nut to compress the spring.

5. A method of disengaging a bayonet connector which in connection with a complementary bushing comprises an assembly including a bayonet connector, a complementary coupling nut and connected optical fiber cable wherein the connector comprises; an alignment ferrule having a central passage aligning the optical fiber of the connected optical fiber cable, a spring loaded coupling nut moveable axially over the ferrule and having a pattern of raised knurls and further having J-shaped slots wherein each slot consists of a hook portion and a stem portion, and the fixed coupling bushing comprises; a body of shape complementary to said bayonet connector and with the ferrule of said bayonet connector received there within, and with the nut of said bayonet connector encompassing the said body, and further, having pins perpendicular to the circumference of said body, said pins received within the slots of said nut with the nut biased by said spring load to maintain each said pin at the end of the hook of each said slot, the method comprising:

encompassing the nut of said bayonet connector within the cradle-shaped forward extension of a tool, the tool comprising; a trough-shaped main body with cup-shaped center bore extending therethrough, cradle-shape forward extension with cup-shaped bore coextending with the bore of said main body and inset into the front of said main body to form a partial annular shoulder at the intersection of the extension with said main body; said extension having forward-extending L-shaped engaging tangs with rear stems forming latching recesses circumferential to the said common bore, the latching recesses shaped to accept and abut against the pattern of raised knurls of the bayonet connector;

abutting the rear end of said nut against the partial annular shoulder of the tool;

rotating the tool to engage the pattern of raised knurls of the bayonet connector within said latching recesses;

advancing the tool and encompassed nut against the bias of said spring load to disengage each bushing pin from the hook of each J-slot;

rotating the tool and encompassed nut to align the stem of each J-slot to each pin;

withdrawing said tool and encompassed nut to thereby pass the stem of the J-slot along the pin to exit the pin from engagement in said slot thereby disengaging said bayonet connecter and cable from said complementary coupling bushing.

6. A method of attaching a bayonet connector which in connection with a complementary bushing comprises an assembly including a bayonet connector, a complementary coupling nut and connected optical fiber cable wherein the connector comprises; an alignment ferrule having a central passage aligning the optical fiber of the connected optical fiber cable, a spring loaded coupling nut moveable axially over the ferrule and having a pattern of raised knurls and further having J-shaped slots wherein each slot consists of a hook portion and a stem portion, and the fixed coupling bushing comprises; a body of shape complementary to said bayonet connector and with the ferrule of said bayonet connector received there within, and with the nut of said bayonet connector encompassing the said body, and further, having pins perpendicular to the circumference of said body, said pins received within the slots of said nut with the nut biased by said spring load to maintain each said pin at the end of the hook of each said slot, the method comprising:

encompassing the nut of said bayonet connector within the cradle-shaped forward extension of a tool, the tool comprising; a trough-shaped main body with cup-shaped center bore extending therethrough, cradle-shape forward extension with cup-shaped bore coextending with the bore of said main body and inset into the front of said main body to form a partial annular shoulder at the intersection of the extension with said main body; said extension having forward-extending L-shaped engaging tangs with rear stems forming latching recesses circumferential to the said common bore, the latching recesses shaped to accept the said pins of the bushing complementary to said bayonet connector;

abutting the rear end of said nut against the partial annular shoulder of the tool;

rotating the tool to engage the pattern of raised knurls of the bayonet connector within said latching recesses;

fitting the ferrule of the bayonet connector to within the body of the coupling bushing, and with pins of the bushing aligned with respective stems of the J-shaped slots of the connector;

advancing the tool and encompassed nut against the bias of said spring load to thereby pass each stem of the J-slot along the pin to advance each said pin to the end of each stem of the slots;

rotating the tool and encompassed nut to align each of said pin with a respective hook of each said slot; and withdrawing the tool and encompassed nut with the bias of said spring load to engage each said bushing pin within the hook of each J-slot.

* * * * *